United States Patent [19]

Hon

[11] Patent Number: 5,679,129
[45] Date of Patent: Oct. 21, 1997

[54] ENCAPSULATED FERTILIZERS AND PESTICIDES AND PROCESS

[75] Inventor: David N.-S. Hon, Clemson, S.C.

[73] Assignee: Clemson University, Clemson, S.C.

[21] Appl. No.: 468,765

[22] Filed: Jun. 6, 1995

Related U.S. Application Data

[63] Continuation of Ser. No. 167,548, Dec. 15, 1993, abandoned.

[51] Int. Cl.⁶ .............................. C05G 3/00; C05G 3/02
[52] U.S. Cl. .................... 71/64.11; 71/64.13; 71/25; 106/15.05; 523/122
[58] Field of Search ............................. 71/64.13, 64.07, 71/64.11, 23, 25, 26, 27; 424/78; 524/34; 106/15.05; 523/122

[56] References Cited

U.S. PATENT DOCUMENTS

| | | |
|---|---|---|
| Re. 21,638 | 11/1940 | Treeland . |
| Re. 32,356 | 2/1987 | Cardarelli .................. 424/78 |
| 2,247,208 | 6/1941 | Schorger . |
| 2,325,570 | 7/1943 | Katzen et al. . |
| 2,788,320 | 4/1957 | Bracey . |
| 3,264,089 | 8/1966 | Hansen . |
| 3,269,824 | 8/1966 | Aswell . |
| 3,269,900 | 8/1966 | Rubin . |
| 3,516,846 | 6/1970 | Matson . |
| 3,708,276 | 1/1973 | Hecht et al. . |
| 3,944,662 | 3/1976 | Miller, Jr. et al. . |
| 3,954,263 | 5/1976 | Whelan et al. . |
| 4,098,649 | 7/1978 | Redker . |
| 4,111,730 | 9/1978 | Balatinecz . |
| 4,123,489 | 10/1978 | Kelley . |
| 4,339,363 | 7/1982 | Nakagima ................. 524/34 |
| 4,376,112 | 3/1983 | Miller . |
| 4,581,846 | 4/1986 | Stensaas . |
| 4,717,743 | 1/1988 | Wakabayashi et al. . |
| 4,968,463 | 11/1990 | Levasseur . |
| 4,975,108 | 12/1990 | Pruitt . |
| 5,008,310 | 4/1991 | Beshay . |
| 5,051,261 | 9/1991 | McGinity et al. .......... 424/464 |
| 5,096,945 | 3/1992 | Sun . |
| 5,130,352 | 7/1992 | Chow . |

FOREIGN PATENT DOCUMENTS

| | | | |
|---|---|---|---|
| 0246227 | 6/1987 | Germany ............. | 71/64.11 |
| 1369204 | 10/1974 | United Kingdom . | |

*Primary Examiner*—Ferris Lander
*Attorney, Agent, or Firm*—Dority & Manning, P.A.

[57] ABSTRACT

A slow release fertilizer or pesticide composition and a method for making the same is provided. The composition is made by combining thermoplastic resin with cellulosic material and then adding a fertilizer or pesticide. The thermoplastic resin and the cellulosic material preferably come from the solid waste stream. The resulting composition can be molded into various articles or ground into a granular powder.

23 Claims, No Drawings

ENCAPSULATED FERTILIZERS AND PESTICIDES AND PROCESS

This is a continuation of application Ser. No. 08/167,548, filed Dec. 15, 1993, which was abandoned upon the filing hereof.

FIELD OF THE INVENTION

A composition and process for producing slow release fertilizers and pesticides encapsulated in a mixture of cellulosic materials and thermoplastics are provided.

BACKGROUND OF THE INVENTION

This invention relates to encapsulated, slow release fertilizer and pesticide compositions. Fertilizers and pesticides applied to crops in their pure form create many problems. For instance, when uncoated fertilizers are applied to the soil, they quickly dissipate after their first contact with water. In some instances, plants will receive too much fertilizer at one time which burns plant roots and retards plant growth. This problem is intensified due to the fact that most fertilizers in their pure state are dust-like in size, making uniform application difficult. Further, because of rapid dissipation, the fertilizer must be applied several times during a growing season for optimum results. However, the plants will still only grow in spurts.

The same problems exist in the use of pesticides. Pesticides include, among others, insecticides, herbicides and fungicides. For pesticides to be effective, there must be uniform application and there must be a sustained presence in an adequate concentration.

Consequently, various means have been employed to create a slow release mechanism for fertilizers and pesticides. For instance, U.S. Pat. No. 3,264,089 discloses a fertilizer core coated or encapsulated by water-insoluble urethane coating compositions. Urethane coating resins are produced by the reaction of isocyanates with hydroxyl-containing materials. The urethane coating resin is mixed with, preferably, a catalyst and a solvent. A fertilizer is added and the solvent is rapidly dried. This process can be repeated to obtain a plurality of coatings if desired.

Also, U.S. Pat. No. 3,269,900 discloses a polyurethane foam composition containing from 25% to 75% by weight of an organic, non-volatile pesticide. The pesticide is added during formation of the foam. The foam can be cut, ground, or milled to any desired particle size. The field environment then promotes degradation and decomposition of the polyurethane foam to free the organic, non-volatile pesticide.

Another controlled release fertilizer composition having an enveloping layer consisting of a water-insoluble synthetic resin having foreign particles incorporated into it is disclosed in U.S. Pat. No. 3,708,276. The synthetic resin may be comprised of copolymers or siccative oils such as linseed oil or soybean oil with cyclopentadiene, optionally modified by indene-addition by means of alkyd resins or other substances such as paraffin waxes. The foreign particles incorporated into the resin can be non-homogeneous with the resin such as salts, oxides and metals or can be homogeneous in the form of organic substances which swell when in contact with water. Such organic substances include gelatin, polyvinyl propionate, butadiene-acrylonitrile copolymers, or alpha-methylcellulose. Alpha-methylcellulose is a water-soluble product of cellulose methylation. The foreign particles are added into a solution or emulsion of the synthetic resin and then sprayed on the granular fertilizer.

U.S. Pat. No. Re. 21,638 also discloses a time release fertilizer composition. An absorbent granular material, such as wood pulp, sawdust, etc., is impregnated with a substantially saturated solution of sulphate of ammonia, muriate of potash and water. Any excess liquid is drained off and the granules are mixed with a composition consisting of about 90% mineral black and 10% carbon black to form a coating, closing off the pores. The sealed and impregnated granular material is then mixed with a composition of super phosphate and black loam soil.

U. S. Pat. Nos. 3,516,846 and 2,788,320 disclose the use of an aminoplastic resin to encapsulate a pesticide. Specifically, U.S. Pat. No. 2,788,320 addresses hardening the aminoplastic film by irradiating the surface with ultra-violet radiation.

U.S. Pat. No. 3,269,824 discloses a waste paper soil conditioning and fertilizing pellet. Waste paper is macerated and re-pulped. Water is then added and the mixture is pressure cooked into a slurry of finely divided fibers. Fertilizers, trace elements, and other inorganic constituents are added. The resulting composition is then drained, extruded into shape and dried.

U.S. Pat. No. 3,954,263 discloses a golf tee in which a mixture of grass seed, plant food, and a carrier material such as cellulose is combined and then fully coated with a polyurethane coating. The exterior of the molded tee is coated with polyurethane so that the decomposing process will not take place until the tee is either broken or is cut with a grass mower so as to break through the coating and expose the growth material. Varnish, hard rubber, plastics, wax, fiberglass or the like can also be used for the coating as long as an impenetrable barrier is formed.

U.S. Pat. No. 4,376,112 discloses an encapsulated efficacious zinc phosphide rodenticide. Zinc phosphide, a known rodenticide, is coated with a thermoplastic polyamide polymer. The polymer coating breaks down in a rodent's stomach, releasing the poison.

U.S. Pat. No. 4,123,489 discloses a method for converting waste paper materials into plant mulches, lightweight concrete aggregates, fertilizers, animal feeds, chemical food stock and other materials, fuels, and uses such as recycling paper processes.

U.S. Pat. No. 3,944,662 discloses non-volatile slow-release pesticidal generators. Specifically, a non-volatile vinyl phosphate pesticide is dispersed in a plasticized thermoplastic resin. The pesticide migrates onto the resin surface and is maintained thereon in a certain crystalline form. These generators can be used on a collar to control fleas or ticks.

U.S. Pat. No. 4,581,846 discloses a system and method for the fertilization of forest, farm and other large plant communities. Insoluble organic and mineral compounds are converted to soluble plant nutrients by means of first microorganisms living within the cellulosic matrix of a large package. The system then utilizes second microorganisms interconnecting plant roots to distribute the nutrients in a radial cascade.

Finally, U.S. Pat. No. 4,975,108 discloses a controlled release composition made from cellulosic pulp rejects. The pulp rejects are de-watered and flash-dried causing the rejects to expand and become porous. Fertilizers, herbicides or fungicides can be used to impregnate the porous rejects. Upon drying, the cellulosic material retains the additive for delayed release.

Although the prior art discloses slow release compositions or encapsulating substances, the particular features of the present invention remain absent. The prior art is generally deficient in providing an effective slow-release composition made from a mixture of thermoplastics and cellulosic materials. The prior art is also deficient in providing an effective slow-release composition that is economically practical to make. The present invention overcomes the shortcomings of the prior art in that the composition and process disclosed herein result in an effective time released composition containing either a fertilizer or a pesticide which can be produced economically.

SUMMARY OF THE INVENTION

It is an object of the present invention to provide a slow release fertilizer or pesticide composition.

It is another object of the present invention to provide a fertilizer or pesticide composition encapsulated by a mixture of waste cellulosic materials and waste thermoplastic materials.

Still another object of the present invention is to provide a method for making a slow release fertilizer or pesticide composition.

Still another object of the present invention is to provide a slow release fertilizer or pesticide composition in the form of a spike.

Yet another object of the present invention is to provide a slow release fertilizer or pesticide composition in the form of small particles.

It is another object of the present invention to provide a slow release fertilizer or pesticide composition that can be inexpensively made.

Generally speaking, the present invention is directed to a slow release fertilizer or pesticide composition and a method for making that composition. The composition is made from a mixture of thermoplastic resins and cellulosic materials combined with fertilizers or pesticides. Reference to a pesticide includes, among others, insecticides, herbicides and fungicides.

The thermoplastic resins utilized in the present invention may include polyolefins or homopolymers or copolymers of styrene, propylene, vinyl chloride or ethylene, or mixtures thereof. The thermoplastics may be virgin materials or, preferably, used and recycled plastics.

The cellulosic materials available for use in the present invention include papers, paperboards, newsprints, textiles, wood fibers or any lignocellulosic material. Again, the cellulosic materials preferably come from the solid waste stream. The cellulosic material preferably includes printed waste materials such as old newspapers or magazines.

One of the principal advantages of the present invention is the ability to use and reclaim materials from the solid waste stream. Raw materials needed to make plastics and paper products are rapidly becoming depleted while major problems exist in the handling and disposal of solid wastes. Also, because the invention utilizes waste materials, the final product is relatively inexpensive to produce.

Any fertilizer or pesticide may be used in the present invention. The fertilizer or pesticide, however, will be more effective if it is water soluble. More importantly, the fertilizer or pesticide used will depend upon the crop, the soil conditions and/or the organisms that are to be eliminated.

The method of making the present invention first involves preparing the cellulosic material for mixing with the thermoplastic resin. The cellulosic material may be mechanically ground or cut and then optionally passed through a mesh sieve of a desired size. Alternatively, the cellulosic material can also be pre-treated with water. If the cellulosic material is immersed in water before being added to the thermoplastic resin, little, if any, defiberation or mechanical grinding or cutting is required.

The thermoplastic resins are prepared by heating in a mixing device until a molten matrix is formed. The cellulosic materials are then gradually added to the molten matrix. Mixing is continued and a selected temperature is maintained. The temperature of the mixture is then allowed to drop and the fertilizer or pesticide is mixed in. The temperature must be low enough so as not to substantially degrade the added fertilizer or pesticide. The mixture can be formed into different shapes or dried and ground into particles of a desired size.

The amount of mixing of the thermoplastic resin with the cellulosic materials and the fertilizer or pesticide is not a critical factor. Generally speaking, mixing is sufficient when the cellulosic materials and the fertilizer or pesticide are dispersed within the thermoplastic resin. Uniform consistency or equal distribution of the components is not necessary when producing the slow release composition.

The overall properties of the present invention, and specifically the slow release mechanism, depend upon the amount of thermoplastic resin incorporated into the final product. The greater the percentage of thermoplastic used, the slower the fertilizer or pesticide will be released from the composition.

Also, a factor in controlling the rate of release of the fertilizer is the size of the particles. After mixing the thermoplastic resin with the cellulosic materials and fertilizer or pesticide, the final product is a composite. The composite can be molded into different shapes or can be ground into particles. The larger the particle, the longer it will take for the fertilizer or pesticide to be released.

To release the fertilizer or pesticide, the cellulosic material in the present invention absorbs and retains water. The cellulosic material is embedded in the thermoplastic resin. Water is absorbed by the cellulosic material which flows into the composite. Water then acts as a carrier as it moves out of the composite taking the fertilizer or pesticide with it. In this manner, the fertilizer or pesticide is released.

DESCRIPTION OF A PREFERRED EMBODIMENT

A composition and process for producing a slow release fertilizer or pesticide are provided. Generally, this composition comprises a mixture of thermoplastic resin, cellulosic material, and either a fertilizer or pesticide. The mixture can be used to form different structural objects or can be ground into a specific particle size.

The thermoplastic resin present in the composition of the invention may be any thermoplastic. The only property of importance is the melting point. As explained below, the thermoplastic resin used to make the composition of the present invention is heated into a molten matrix into which the cellulosic materials and the fertilizer or pesticide are added. If the melting point of the thermoplastic resin is relatively high, then the higher temperature needed to make the molten matrix may cause the cellulosic material, the fertilizer or the pesticide to burn or otherwise degrade. Accordingly, the thermoplastic resin utilized in making the composition of the present invention should not require, when being reduced to a molten state, temperatures that will harm the particular cellulosic materials, the particular fertilizer or the particular pesticide during mixing.

Examples of thermoplastics with lower melting points would include polyolefins (e.g., polyethylene, polypropylene, polybutylene), vinyls (e.g., polyvinyl chloride, polyvinyl acetate, and various vinyl polymers), and styrene resins (e.g., polystyrene). Other thermoplastics could, of course, be employed if the fertilizer or pesticide can withstand higher temperatures. The resin may be present as a homopolymer, a copolymer, or mixtures thereof, and in any combination of the thermoplastic resins mentioned above. Preferably, the thermoplastic resins are waste materials that have been discarded or waste materials reclaimed from the solid waste stream. Virgin materials, of course, may be used.

The cellulosic materials present in the composition of the present invention may be any material made from cellulose fibers. Such materials include papers such as newsprints, typing paper, book paper, magazine paper, telephone directories, and all other papers. Also included are paperboard, wood fibers, including sawdust and pulverized wood, textiles, including rayons, cottons, ramie, bamboos, jute, bagasse, and any other materials having cellulosic fibers. Preferably, the cellulosic materials are waste materials reclaimed from the solid waste stream or are salvaged waste materials which have been discarded and are intended for the solid waste stream. Such products may include discarded newspapers, discarded packaging materials, discarded books, discarded telephone directories, and discarded textile materials.

The fertilizer or pesticide used in making the composition of the present invention will depend upon the crop, the soil conditions and/or the organisms that are to be eliminated. The term pesticide includes, among others, herbicides, insecticides and fungicides. The fertilizer or pesticide selected must not degrade beyond effectiveness when added to the thermoplastic and cellulosic material mixture. Preferably, the fertilizer or pesticide is at least semi-water soluble.

The slow release mechanism of the present invention is primarily dependent upon the proportion of thermoplastic resin used in making the composition. Typically, encapsulated fertilizers and pesticides remain active within the composite for six months to two years. In other words, the composition will slowly release the fertilizer or pesticide over a six-month to two-year period. Consequently, the thermoplastic resin is generally present in the composition in an amount of from about 5% to about 95% by weight. The amount of cellulosic material in the composition can range from 5% by weight and up. The exact proportions of the components will vary depending on, again, the desired amount of time required for the composition to release the fertilizer or pesticide. In one preferred embodiment, the thermoplastic resin is present in an amount of from about 25 percent to about 60 percent by weight.

Before adding the cellulosic materials to the molten thermoplastic resin, the cellulosic materials may be pretreated by saturating them with moisture. The cellulosic materials may be soaked in water until a moisture content of from about 10% to about 200% by weight is achieved. As used herein, moisture content refers to the amount of water relative to the dry weight of the cellulosic materials used. Pretreating the cellulosic materials with water substantially eliminates the need to mechanically grind or cut the material and may also improve the strength of the resulting composite.

If the presence of high moisture will irreversibly change or damage the fertilizer or pesticide chosen, then the cellulosic material may be added dry. The cellulosic material can be mechanically ground, shredded or cut to a desired size. The cellulosic material could also be pretreated with water, sized, and then dried before addition to the molten thermoplastic.

An encapsulated, slow release fertilizer or pesticide is preferably made as follows. Initially, the thermoplastic materials are collected from the waste stream, such as from recycle centers, municipal solid waste dumps, etc., and washed to remove any metallic or other undesirable matter. The desired cellulosic materials to be used in the composite are then prepared for addition to the thermoplastic resin. As described above, the cellulosic materials can be pretreated with water. The preferred moisture content of the fiber after pretreatment is between about 10 percent and about 100 percent by weight of the fibers.

In another embodiment, the cellulosic materials may be ground into small pieces. Those familiar with the art will understand the wide variety of mechanical devices and instruments that could be used to size the cellulosic material. By way of example only, one such machine is a Wiley mill.

In a third embodiment, the cellulosic materials can be pretreated with water and then dimensionally sized. After sizing, the materials could be dried before being added to the thermoplastic resin.

A molten matrix of the chosen thermoplastic resin(s) is created by heating the thermoplastic resin in a mixer. In the hereinafter described examples, a C. W. Brabender Mixer—Measuring Heads with a computerized Plastic-Corder P. L. 2000 was employed as the intensive mixer. Mixer roller speeds are operated at a speed of 60 revolutions per minute (rpm) for 3 minutes. The selected thermoplastic mixture is softened to form the molten matrix by the heat supplied from the mixer's heater in addition to the heat generated by the mixing process.

After the molten matrix of thermoplastic resin is prepared, the cellulosic material is gradually added with continued mixing. Processing at a temperature of about 150° C. for a period of about 10 to 15 minutes after adding the cellulosic material to the thermoplastic resin is one set of parameters that may be employed. During mixing at such elevated temperatures, moisture, if present in the cellulosic material, is converted into steam and released.

After mixing the thermoplastic resin and the cellulosic material for 10 to 15 minutes, the temperature is allowed to drop and the fertilizer or pesticide is added. Mixing is continued for about 1 to 5 minutes or until the fertilizer or pesticide is generally dispersed within the mixture. Of course, the above is only one set of parameters for preparing the mixture.

After mixing, the composition may be ground and compressed or extruded into a desired shape or article. In the alternative, after cooling, the composition may be ground into particles of a desired size. Consequently, the variety of shapes or forms of the final product is limitless. The composition may be molded into spikes, rods or nails for implanting into soil, or may be ground into pellets or powder. The final size of the composition will play a factor in the rate of release of the fertilizer or pesticide. The larger the size, the longer the composite will retain the fertilizer or pesticide.

The composition formed according to the described method results in an effective and economical encapsulated fertilizer or pesticide with a slow release mechanism.

The present invention may be better understood by reference to the following examples.

EXAMPLE 1

Table I lists twelve different fertilizer compositions that were produced and tested according to the present invention.

The cellulosic material used was newspaper. The newspaper was shredded and ground before being added to the molten thermoplastic resin. The thermoplastic resin used was polyethylene. The molten thermoplastic resin and the newspaper were mixed in the intensive mixer as described above. A temperature of about 150° C. and a rolling speed of about 60 rpm was maintained for about 15 minutes. The temperature was then allowed to drop to about 120° C. and the fertilizer was mixed in. The fertilizer used was Hydro Prills (15—15—15) manufactured by Norsk Hydro in Norway. This fertilizer is not a slow release fertilizer. After mixing for about five minutes, the composition was allowed to cool and then ground into a powder. For this particular test, the powder was sized to fit through a 30 mesh sieve.

TABLE I

| Sample Code | Composition (Wt. %) | | |
| --- | --- | --- | --- |
| | Newspaper | Thermoplastic | Fertilizer |
| I | 20 | 40 | 40 |
| II | 20 | 50 | 30 |
| III | 20 | 60 | 20 |
| IV | 30 | 30 | 40 |
| V | 30 | 40 | 30 |
| VI | 30 | 50 | 20 |
| VII | 40 | 20 | 40 |
| VIII | 40 | 30 | 30 |
| IX | 40 | 40 | 20 |
| X | 50 | 10 | 40 |
| XI | 50 | 20 | 30 |
| XII | 50 | 30 | 20 |

EXAMPLE 2

The twelve slow release fertilizer compositions produced in Example 1 were tested for their time release effectiveness. The compositions were immersed in distilled water and subjected to dynamic extraction. Dynamic extraction comprises vibrating the mixture to create an effect similar to natural conditions where water would be flowing over and around the fertilizer. At the end of a 24-hour period, the water was drained off and tested for nitrate concentration by titration. The titration was performed by Fafard Analytical Services of Anderson, S.C. The fertilizer compositions were again immersed in more distilled water for another 24 hours. The nitrate test was repeated and the water was again changed.

All twelve compositions were tested over an eight-day period. Generally, more nitrate was released from the compositions after the first 24-hour period. The reason for the larger nitrate release over the first 24-hour period is not known. However, it is believed that fertilizer on or near the surface of the composition was released during this period. After the first day, the concentrations began to plane off, suggesting a steady and continuous flow of fertilizer out of the composition over time.

EXAMPLE 3

The water tested in Example 2 was also tested for conductivity. The tests were done by Fafard Analytical Services of Anderson, S. C. Conductivity is a measure of the free ions present in solution. Conductivity is representative of the amount of fertilizer released from the compositions.

EXAMPLE 4

The slow release fertilizer compositions of Example 1, except for composition II, were also immersed in distilled water without dynamic extraction for four days to determine the release of nitrate per gram of fertilized composition over a four-day period. As in Example 2, the water was changed every 24 hours. The used water was tested for nitrate concentration. Under the same conditions, two slow release commercial fertilizers were also tested. The commercial fertilizers, manufactured by Grace-Sierra Horticultural Products Company of Millpitas, Calif., were Osmocote (14—14—14) and Osmocote (13—13—13).

EXAMPLE 5

The water tested for nitrate in Example 4 was also tested for conductivity. Specifically, compositions I, III, IV, V, VI, VII and the two commercial fertilizers were tested for conductivity over the four-day period. As explained above, conductivity is representative of the amount of fertilizer released by the compositions.

It will be understood that the invention is not limited to the particular slow release fertilizer composites or processes described herein, nor the particular parameters or dimensions described therefor. Particularly, it should be understood that the present invention works equally well with pesticides as it does with fertilizers. It should also be understood that any fertilizer or pesticide encapsulated with thermoplastics and cellulosic material equivalent to that described falls within the scope of the present invention. Preparation routes of the compositions and process steps therefore are merely exemplary so as to enable one of ordinary skill in the art to employ the method and compositions described herein and used in accordance with the present process. It will also be understood that while the form of the invention shown and described herein constitutes a preferred embodiment of the invention, this description is not intended to illustrate all possible forms of the invention. Aspects of the various embodiments may be interchanged both in whole or in part. The words used are words of description rather than of limitation. Various changes and variations may be made to the present invention without departing from the spirit and scope of the following claims.

What is claimed is:

1. A product for slowly releasing a fertilizer or pesticide composition therefrom, said product consisting essentially of: thermoplastic resin, an absorbent cellulosic material comprising a ground, shredded or cut paper, and a fertilizer or pesticide embedded within said thermoplastic resin, said cellulosic material further being embedded within said thermoplastic resin for allowing water to flow into the product when absorbed by the cellulosic material and for allowing water to act as a carrier for slowly releasing said fertilizer or pesticide as said water moves out of said product.

2. The product as defined in claim 1, wherein said thermoplastic resin is selected from the group consisting of homopolymers or copolymers of polyolefins, polyvinyls, polystyrene and mixtures thereof.

3. The product as defined in claim 1 wherein said thermoplastic resin comprises waste thermoplastic resins.

4. The product as defined in claim 1, wherein said thermoplastic resin is present in said product in an amount from about 5 percent to about 95 percent by weight.

5. The product as defined in claim 1, wherein said cellulosic material comprises newspaper.

6. The product as defined in claim 1, wherein said cellulosic material is present in said product in an amount of at least about 5 percent by weight.

7. The product as defined in claim 1, wherein said product is in the form of a powder.

8. The product as defined in claim 1, wherein said product is in the form of small pellets.

9. The product as defined in claim 1, wherein said product is in the form of a spike.

10. An article for slowly releasing a fertilizer or pesticide composition therefrom, said article consisting essentially of:

a thermoplastic composite containing a fertilizer or pesticide embedded within said thermoplastic composite; and ground, shredded or cut newspaper further embedded within said composite, said newspaper being liquid absorbent for allowing liquids to flow into said composite and for allowing liquids to act as a carrier for slowly releasing said fertilizer or pesticide as said liquids flow out of said composite.

11. The article as defined in claim 10, wherein said article is in the form of a powder.

12. The article as defined in claim 10, wherein said thermoplastic composite is made from a thermoplastic resin, wherein said thermoplastic resin is a material selected from the group consisting of homopolymers or copolymers of polyolefins, polyvinyls, polystyrene and mixtures thereof.

13. The article as defined in claim 12, wherein said thermoplastic resin is present in said article in an amount from about 25 percent to about 60 percent by weight.

14. The article as defined in claim 10, wherein said newspaper is present in said article in an amount of at least 15 percent by weight.

15. A method for slowly releasing a fertilizer or a pesticide into a plant growth medium such as soil comprising the steps of:

(a) providing a polymeric product containing a fertilizer or a pesticide embedded thereon and further essentially containing ground, shredded or cut cellulosic fibers derived from paper embedded therein;

(b) applying said product to said plant growth medium;

(c) applying water to said plant growth medium so that said water flows into said polymeric product through absorption by said cellulosic fibers; and (d) allowing said fertilizer or pesticide to be released from said polymeric product into said plant growth medium by being carried by said water as said water moves out of said product.

16. A method as defined in claim 15, wherein said polymeric product is made from thermoplastic polymers.

17. A method as defined in claim 15, wherein said cellulosic fibers are derived from newspaper.

18. A method as defined in claim 15, wherein said cellulosic fibers are present within said polymeric product in an amount from about 10 percent to about 75 percent by weight.

19. A method as defined in claim 15, wherein said polymeric product is in the form of a pellet.

20. A method defined for slowly releasing a fertilizer or a pesticide into a plant growth medium such as soil comprising the steps of:

(a) providing a polymeric composite product, said product comprising thermoplastic resin, a fertilizer or pesticide embedded within said thermoplastic resin, and an absorbent cellulosic material derived from paper consisting essentially of ground, shredded or cut cellulosic fibers, said cellulosic material further being embedded within said thermoplastic resin;

(b) applying said polymeric composite product to a plant growth medium; and (c) contacting said polymeric composite product with water for releasing said fertilizer or pesticide in a controlled manner, wherein said water is absorbed into said product by said cellulosic material, contacts said fertilizer or pesticide contained therein, and carries said fertilizer or pesticide out of said product over an extended period of time.

21. A method as defined in claim 20, wherein said thermoplastic resin is present within said polymeric composite product in an amount from about 25 percent to about 80 percent by weight.

22. A method a defined in claim 20, wherein said absorbent cellulosic material includes newspaper.

23. A method as defined in claim 20, wherein said absorbent cellulosic material is present within said polymeric composite product in an amount of at least about 15 percent by weight.

* * * * *